US008689207B2

(12) United States Patent
Meller et al.

(10) Patent No.: US 8,689,207 B2
(45) Date of Patent: Apr. 1, 2014

(54) PERFORMING AN IN-PLACE UPDATE OF AN OPERATING STORAGE DEVICE

(75) Inventors: Evyatar Meller, Yad Binyamin (IL); Yair Noam, Ramat-Gan (IL)

(73) Assignee: Red Bend Ltd., Hod Hasharon (IL)

( * ) Notice: Subject to any disclaimer, the term of this patent is extended or adjusted under 35 U.S.C. 154(b) by 889 days.

(21) Appl. No.: 12/535,063

(22) Filed: Aug. 4, 2009

(65) Prior Publication Data
US 2010/0031245 A1    Feb. 4, 2010

Related U.S. Application Data

(60) Provisional application No. 61/085,880, filed on Aug. 4, 2008.

(51) Int. Cl.
*G06F 9/44* (2006.01)
*G06F 7/00* (2006.01)
*G06F 17/30* (2006.01)

(52) U.S. Cl.
USPC ........... 717/170; 717/168; 707/623; 707/638; 707/695; 707/999.01; 707/999.202; 707/999.203

(58) Field of Classification Search
None
See application file for complete search history.

(56) References Cited

U.S. PATENT DOCUMENTS

| | | | |
|---|---|---|---|
| 4,425,618 A | 1/1984 | Bishop et al. | |
| 6,018,747 A | 1/2000 | Burns | |
| 6,023,620 A * | 2/2000 | Hansson | 455/419 |
| 6,275,931 B1 * | 8/2001 | Narayanaswamy et al. | 713/2 |
| 6,278,885 B1 * | 8/2001 | Hubbe et al. | 455/558 |
| 6,510,552 B1 * | 1/2003 | Benayoun et al. | 717/170 |
| 6,546,552 B1 * | 4/2003 | Peleg | 717/170 |
| 6,564,215 B1 * | 5/2003 | Hsiao et al. | 1/1 |
| 6,754,848 B1 * | 6/2004 | Froehlich et al. | 714/28 |
| 6,832,373 B2 * | 12/2004 | O'Neill | 717/171 |
| 6,834,331 B1 * | 12/2004 | Liu | 711/156 |
| 6,874,001 B2 * | 3/2005 | Narang et al. | 1/1 |

(Continued)

FOREIGN PATENT DOCUMENTS

| | | |
|---|---|---|
| WO | WO2004/114130 | 12/2004 |
| WO | WO2005/003963 | 1/2005 |
| WO | WO2007/023497 | 3/2007 |

OTHER PUBLICATIONS

"Cost-Effective Analysis of In-Place Software Processes" by Jonathan E. Cook, Lawrence G. Votta, and Alexander L. Wolf, IEEE Transactions on Software Engineering, vol. 24, No. 8, Aug. 1998, p. 650-663.*

(Continued)

*Primary Examiner* — Henry Tsai
*Assistant Examiner* — Jing-Yih Shyu
(74) *Attorney, Agent, or Firm* — Buchanan Ingersoll & Rooney PC

(57) ABSTRACT

A method of updating an original version of content to a new version of content, in a non-volatile memory storage device is provided. The method comprising: providing a non-volatile content memory storage area; performing, while at least part of the content memory storage is being used, at least one in-place update operation that comprises writing at least one block of content associated with a particular version onto a corresponding block of content associated with a version other than the particular version; and performing, while the at least one in-place update operation occurs, a rendering process that comprises provision of requested content from the content memory storage area.

13 Claims, 3 Drawing Sheets

(56) References Cited

U.S. PATENT DOCUMENTS

| | | | |
|---|---|---|---|
| 6,985,995 B2* | 1/2006 | Holland et al. | 711/114 |
| 7,082,549 B2* | 7/2006 | Rao et al. | 714/6.2 |
| 7,240,228 B2* | 7/2007 | Bear et al. | 713/320 |
| 7,620,669 B1* | 11/2009 | Novick et al. | 1/1 |
| 7,711,989 B2* | 5/2010 | Wang et al. | 714/36 |
| 7,730,326 B2* | 6/2010 | Girish et al. | 713/191 |
| 7,865,479 B2* | 1/2011 | Gu et al. | 707/693 |
| 8,438,558 B1* | 5/2013 | Adams | 717/170 |
| 8,533,410 B1* | 9/2013 | Corbett et al. | 711/162 |
| 2003/0217257 A1 | 11/2003 | Ebsen et al. | |
| 2005/0055595 A1* | 3/2005 | Frazer et al. | 713/400 |
| 2005/0085222 A1* | 4/2005 | Przybilski et al. | 455/418 |
| 2005/0216530 A1* | 9/2005 | Meller et al. | 707/203 |
| 2006/0004756 A1* | 1/2006 | Peleg et al. | 707/8 |
| 2010/0185921 A1* | 7/2010 | Meller et al. | 714/763 |

OTHER PUBLICATIONS

U.S. Appl. No. 11/997,134, filed Jul. 22, 2010, Evyatar Meller.
International Buisness Machines Corporation: "Method for permitting several versions of a module to coexist within a virtual machine" Research Disclosure, Mason Pubications, Hampshire, GB vol. 443 No. 177, Mar. 1, 2001.
International Search Report of the International Searching Authority for PCT/IL2009/000755 dated Feb. 15, 2010.
Written Opinion of the of the International Searching Authority for PCT/IL2009/000755 dated Feb. 15, 2010.

* cited by examiner

PERFORMING AN IN-PLACE UPDATE OF AN OPERATING STORAGE DEVICE

CROSS REFERENCE TO RELATED APPLICATIONS

This U.S. Patent Application claims priority to U.S. Provisional Application No. 61/085,880, filed on Aug. 4, 2008, which is incorporated herein by reference.

BACKGROUND

1. Technical Field

This invention relates to updating content stored in a storage device. More specifically this invention relates to in-place updating an original version of content in a non-volatile storage to an updated version.

2. Discussion of Related Art

It is sometimes required to update content stored in a storage device. For example, if the content is software, or a program (such as an executable file), it is sometimes required to fix a bug existing therein or introduce new features thereto. Yet, the latter example is non-limiting and other types of content may also require updates, such as text, data stored in a database, etc. The terms "old version" or "original version" refer to a version of content before update, and the terms "new version" or "updated version" refer to a version that includes already updated content. In other words, an original version includes "original content" while an updated version includes "updated content". It should be noted that updated content can be further updated. In case of a second update, for example, the updated content of the first update turns to be original content of the second update while new updated content is generated by the second update etc.

A process during which original content is updated yielding updated content is referred to as an "update process". The update process usually requires instructions on how to perform the update. Such instructions constitute together an "update package", wherein each instruction included therein constitutes an "update command". That is an update package is obtained as input, and during the update process, original content is updated to updated content in accordance therewith. This is non-limiting though and sometimes more than one update package can be obtained which together allows the updating of content. Alternatively, instead of an update package being obtained, an update package (or a set of update commands) may be retrieved from a storage or from a database etc. Hence, hereinafter, when referring to the term "obtaining an update package" it should that the update package can be passively obtained or actively retrieved or sometimes an embedded package (e.g., a hard coded set of update commands) can be activated.

One way to update an original version to an updated version is storing the updated version in the storage in addition to the original version. For example, a computer program "prog.exe" is activated whenever a user presses a certain icon on the PC (Personal Computer) windows desktop. In order to update prog.exe it is possible to store the updated version of this file in a different location than the present (original) version, and then reset the path associated with the icon so as to activate the updated version instead of the original version. Later, when it is ascertained that the update process completed successfully, the original version can be deleted safely, releasing the space occupied thereby. In addition to increasing storage consumption, this latter update method requires that the complete updated version be provided to the update process, e.g., in the update package. Such an update package easily becomes huge in size, and if it is required to transmit it to the updatable device via band-width limited communication channels, transmittance may become cumbersome and sometimes even impossible. Therefore, it is preferable that the size of the update package be reduced along with reducing the device's storage consumption.

Another update method, which storage-wise is preferable to the latter method mentioned above, requires transmitting the complete updated version in the update package and simply overwriting original content with updated content. This update method may turn out to be risky and non-reliable, because if the update process fails in the middle of operating, when part of the original version is already overwritten, while only part of the updated version is written to the storage, it is appreciated that the version stored in the storage at the time of interruption may be invalid or inoperable. In this case, provided that the update package is still accessible, the update process may be restarted from the beginning. It is noted that updating content by overwriting the original content with the updated content is commonly referred to in the art as "in-place update", and the like.

One way for reducing the size of an update package is by including in it information representing the differences between the original and updated content. Such an update package is sometimes referred to also as a "difference", a "difference result" or a "delta". The update process, upon operating in accordance with a delta, applies it to the original content, hence producing the updated content. Deltas may be produced using the known in the art differencing algorithms (such as "GNU diff") in a naïve manner, though such deltas tend to be rather large.

The size of the delta being considered, there are methods trying to reduce the size thereof. For example, U.S. Pat. No. 6,546,552 ("Difference extraction between two versions of data-tables containing intra-references", published 2003), which is incorporated herein by reference in its entirety, discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WIPO Publication No. WO 2004/114130 ("Method and system for updating versions of content stored in a storage device", published 2004), which is incorporated herein by reference in its entirety, discloses another system and method for generating a compact update package between an old version of content and a new version of content. The system of WIPO Publication No. WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WIPO Publication No. WO 2005/003963 ("Method and system for updating versions of content stored in a storage device", published 2005), which is incorporated herein by reference in its entirety, discloses a system and method for updating versions of content stored in a storage. The system of WIPO Publication No. WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

It was noted before that a certain type of update package is sometimes referred to as a delta, however, this is non-limiting, and as it appears from WIPO Publication No. WO 2004/114130 and WIPO Publication No. WO 2005/003963, an update package may sometimes include a delta therewith, or as another example the update package may include the entire updated version.

Other methods exist in the art which take care of additional considerations involved in the update. Prior to elaborating on other methods these considerations should be pointed out.

It is appreciated that content is normally stored in a storage. A storage can include volatile memory, i.e., volatile storage (such as Random Access Memory RAM, etc.) and/or non-volatile memory, i.e., non-volatile storage (such as a hard disk, flash memory, EPROM (Erasable Programmable Read-Only Memory) and/or EEPROM (Electrically EPROM), etc).

There are storages that are organized in discrete areas, referred to, e.g., as blocks or sectors, wherein one block can include content belonging to more than one file. Hence, if there are, for example, two files stored in a storage device, a single block can include several ('x') bytes belonging to a first of the two files, as well as several ('y') bytes belonging to a second of the two files. If the size of a block is 'z' bytes, it is clear that $z \geq x+y$. Yet, those versed in the art would appreciate that writing content into a block affects other content stored therein. That is, if it is required to re-write the content stored in the x bytes of the first file (e.g., during update thereof), due to storage limitations it may be impossible to write only those x bytes, and it may be necessary to write the content of all the z bytes to the storage. This can be done, for example, by reading content stored in the z bytes from the non-volatile storage to a volatile storage not including blocks, such as RAM, updating only the content stored in the x bytes in the volatile storage (that is, the content of the other z-x bytes is left unaffected therein) and then writing the content of the z bytes back to the non-volatile storage. This limitation characterizes flash memory, for example, wherein it is required to completely delete the present content of a block, before new content (including updated content) can be written thereto, and hard disks where it is not obligatory to delete the complete sector before writing data thereto, but it is required to write the complete content of a block in one writing operation (e.g., it is impossible to write only x bytes when leaving the content stored in the z-x bytes unaffected. In order to leave the z-x bytes unaffected, it is required to store the content thereof in the volatile memory and write them back into the block, together with the x bytes). Hence, the update procedure may require many write operations to the storage including blocks, and it is appreciated that if it is desirable to achieve an efficient update, the update should better be optimized. For example, if x equals, for example, two bytes, than these two bytes should better be updated together, instead of updating the first byte and then the second byte, writing these two bytes separately into the block.

Furthermore, when in-place updating an original version (including original content) to an updated version (including updated content), there are sometimes update commands that use original content in order to generate updated content. For example, it is possible to copy original content from one place to a different place in the storage, wherein this copied content, in its destination place, forms part of the updated version. When copying content to a destination place it should be appreciated that this destination place could have been used before for storing other content (possibly also being part of the original version). Hence, the copied content can overwrite the original content at the destination place. Still further, it is possible that there is another update command that uses the destination place's original content in order to generate updated content. If this other update command is called further to operating in accordance with the first copy command, the destination place's original content can be already overwritten. This situation constitutes a "write before read conflict". Herein below unless otherwise noted the term "conflict" is used for short for "write before read conflict".

Write before read conflicts are a known problem in the art and U.S. Pat. No. 6,018,747 tries to cope therewith. U.S. Pat. No. 6,018,747 ("Method for generating and reconstructing in-place delta files", published 2000), which is incorporated herein by reference in its entirety, discloses a method, apparatus, and article of manufacture for generating, transmitting, replicating, and rebuilding in-place reconstruct software updates to a file from a source computer to a target computer. U.S. Pat. No. 6,018,747 stores the first version of the file and the updates to the first version of the file in the memory of the source computer. The first version is also stored in the memory of the target computer. The updates are then transmitted from the memory of the source computer to the memory of the target computer. These updates are used at the target computer to build the second version of the file in-place.

According to U.S. Pat. No. 6,018,747, when a delta file attempts to read from a memory offset that has already been overwritten, this will result in an incorrect reconstruction since the prior version data has been overwritten. This is termed a write before read conflict. U.S. Pat. No. 6,018,747 teaches how to post-process a delta file in order to create a delta file, minimize the number of write before read conflicts, and then replace copy commands with add commands to eliminate conflicts, thus converting a delta file to an equivalent but larger delta file. A digraph is generated, for representing the write before read conflicts between copy commands. A schedule is generated that eliminates write before read conflicts by converting this digraph into an acyclic digraph.

Another known problem in the art is reliability of the update process, or fail safe update. This problem occurs, for example, when a process of updating an original version is interrupted before its normal termination, such as in a power failure. In such a case, there is a possibility that the content of the block which was being updated during the interruption may become corrupted and contain unexpected content.

It was already mentioned before that when in-place updating blocks of content, an original content of a block sometimes forms part of the input used by the update process. In such a case, if the original block (which is corrupted due to interruption) is required, the update process may be unable to resume. It can be impossible to re-update the corrupted block.

U.S. Pat. No. 6,832,373 ("System and method for updating and distributing information", published 2004), which is incorporated herein by reference in its entirety, for example, tries to provide a fail safe update. It discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and according to U.S. Pat. No. 6,832,373's inventors, may be performed more quickly than through the use of technologies existing when U.S. Pat. No. 6,832,373 was filed.

That is, U.S. Pat. No. 6,832,373 describes using a backup block, while all block update operations are performed thereby using two phases 'two-phase protocol' or 'two-phase commit'. According to U.S. Pat. No. 6,832,373, in a first phase of updating a block, the update process writes the updated content to the backup block and verifies that the content is correctly stored. In a second phase, the update process writes the updated content into its target block to form the updated content of the updated target block (thereby overwriting the original content of the target block). Yet, variations of the same method exist, such as copying the original content of the target block into the backup block in the first phase, and in the second phase in-place updating the target block to store the updated content.

The two phase commit (whether the backed up content is the original content or the updated content) can use only one additional backup block, yet, it is time consuming, since every write operation requires performing two operations (for the two phases). In addition, according to U.S. Pat. No. 6,832,373 every backup operation backs up the complete (original or updated) content of a block in the backup block, and hence if the number of blocks whose content is updated by the update process is n, the total number of operations required for the update process (including update operations and write operations into the backup block) cannot be smaller than 2n. If there are blocks in which content is stored in more than one write operation, the number of operations that the update process is required to perform will be even larger than 2n.

WIPO Publication No. WO 2007/023497 ("Method and system for in-place updating content stored in a storage device", published 2007), which is incorporated herein by reference in its entirety, discloses a system and method for reliable in-place update, performing m block storage operations, including write operations and backup operations, wherein $2<=m<2n$. WIPO Publication No. WO 2007/023497 protects before updating all the original content requiring protection, using a protection buffer (also known as a backup buffer) and the delta file. Thus, WIPO Publication No. WO 2007/023497 resolves write before read conflicts as well as maintaining reliable update.

Another known problem is the difficulty of reversing an in-place update in order to restore original content which has already been overwritten by updated content. U.S. Patent Publication No. 2006/0004756 tries to cope with this problem. U.S. Patent Publication No. 2006/0004756 (Method and system for in-place updating content stored in a storage device", published 2006), which is incorporated herein by reference in its entirety, describes a method and system for updating a stored version of content stored in a storage using an update package. The update package that includes update commands is adapted for updating an original version of content to an updated version. The updating is carried out in accordance with an update sequence. The method includes determining direction of the updating. If the direction is indicative of forward then the method forward-updates the stored version to the updated version in accordance with the update sequence. If the direction is indicative of roll-back, the method generates a roll-back update sequence opposite to the update sequence and rolls-back the stored version to the original version in accordance with the roll-back update sequence.

Typically in the prior art, in-place updating occurs while a device is not operational.

There is a need in the art, thus, for mechanisms for in-place updating original content of an original version, generating an updated version, when a device is operational.

BRIEF SUMMARY

Embodiments of the present invention provide a method of updating in-place original content stored in a non-volatile memory associated with a device to yield updated content, comprising: performing an in-place update while the device is used, including writing updated content in place of original content in the non-volatile memory; and performing a rendering process while the in-place update is being performed, including providing requested content.

Embodiments of the present invention provide an apparatus for updating in-place original content stored in a non-volatile memory associated with a device to yield updated content, comprising: a non-volatile memory configured to store the original content until updated in place; an updater configured to perform an in-place update while the device is operational, including being configured to write updated content in place of original content in the non-volatile memory; and a rendering module configured to provide requested content while the updater is performing an in-place update.

Embodiments of the present invention provide a program storage device readable by machine, tangibly embodying a program of instructions executable by the machine to perform method steps for updating in-place original content stored in a non-volatile memory associated with a device to yield updated content, comprising: performing an in-place update while the device is used, including writing updated content in place of original content in the non-volatile memory; and performing a rendering process while the in-place update is being performed, including providing requested content.

Embodiments of the present invention provide a computer program comprising computer program code means for performing a method of the invention when the program is run on a computer. According to the present invention, there is yet further provided a computer program embodied on a computer readable medium.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
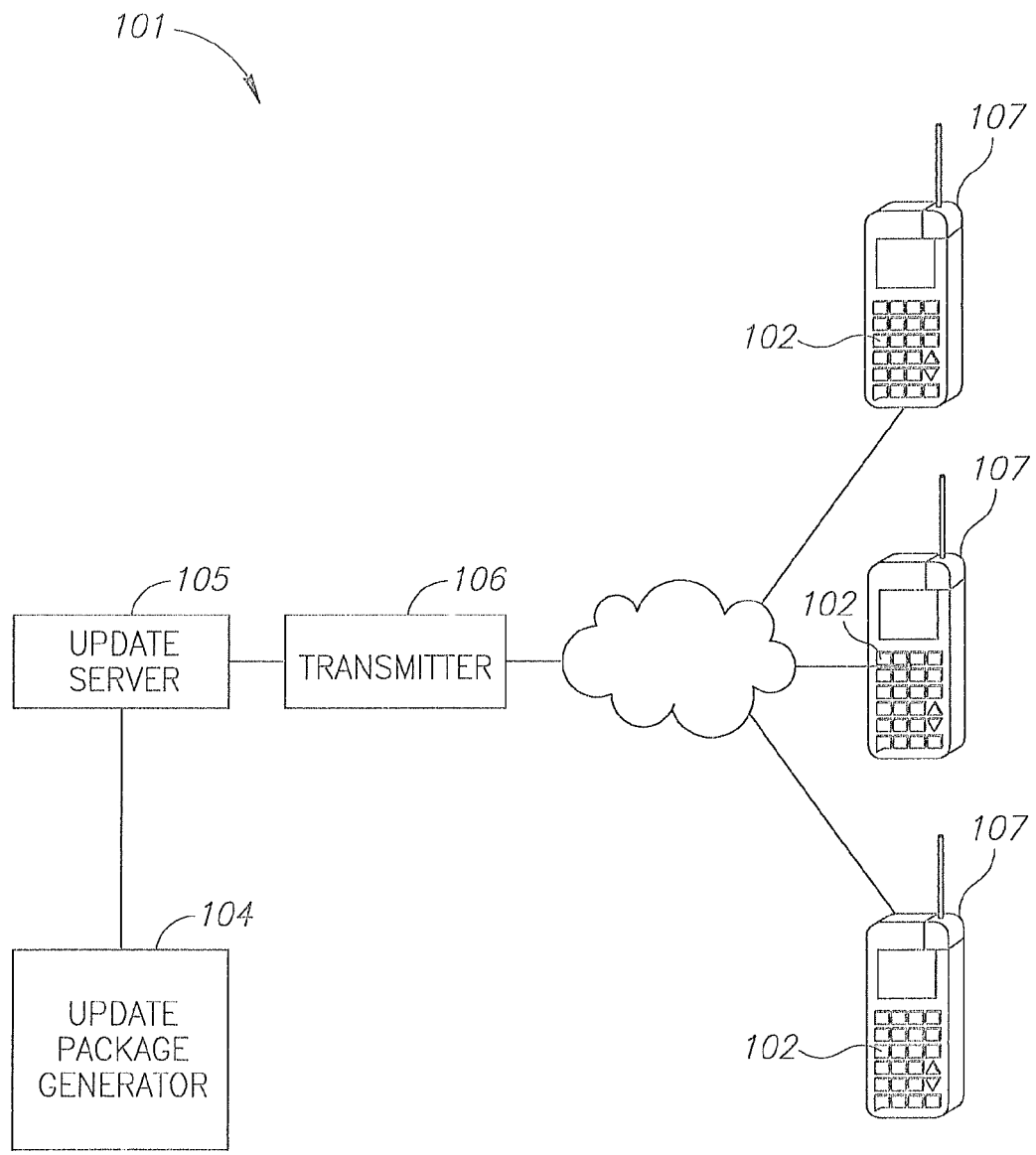
FIG. 1 is a high level schematic illustration of a system for updating content in a cellular network, in accordance with an embodiment of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic illustration of a system 101 for updating content in a cellular network, in accordance with one embodiment of the invention. Cellular telephones 102, associated with storages 107, execute programs that enable operation of the cellular telephones and/or updating of the cellular telephones. Storages, such as storages 107, are sometimes referred to also as "memories" or "memory units". Programs for a particular cellular telephone 102 are normally stored in files in associated storage 107. In various embodiments, a storage 107 associated with a particular cellular telephone 102 can include volatile memory, i.e., volatile storage, (such as Random Access Memory RAM, etc) and/or non-volatile memory, i.e., non-volatile storage, (such as a hard disk, flash memory, EPROM (Erasable Programmable Read-Only Memory) and/or EEPROM (Electrically EPROM), etc).

Some or all of storage 107 associated with a particular cellular telephone 102 may be coupled to the cellular telephone and therefore detachable from the cellular telephone. The coupled storage may be local and/or remote to the cellular telephone. Additionally or alternatively, some or all of storage 107 associated with a cellular telephone 102 may be inside the cellular telephone. It is noted that for simplicity of illustration and description only one storage 107 is illustrated and described per cellular telephone 102, but the reader should understand that any particular associated storage 107 may comprise one or more divisible units. In embodiments where there is a plurality of divisible units comprised in storage 107, the plurality of units may all be detachable from associated cellular telephone 102, may all be within associated cellular telephone 102 or may be divided between unit(s) which are detachable and unit(s) which are within associated cellular telephone 102.

It should be noted that the system 101 illustrated in FIG. 1 is a non-limiting example and the invention is not limited to updating programs. Many other types of content stored in storages require update, such as text, data stored in databases, files stored in the storages, etc. Therefore, hereinafter the term "content" will be used instead of "program". The version of the program currently executing on a cellular telephone or any other content currently applicable to the cellular telephone is referred to, hereinafter, as an "old version", "old content", "original version" "original content", or variations thereof.

Sometimes there is a need to update the programs in order for a cellular telephone 102 to execute a newer version thereof, or to update any other content to a newer version, with the new version referred to, hereinafter, as an "updated version", "updated content", "new version", "new content", or variations thereof. Such an updated version is generated in accordance with an update package (which in some examples includes a delta) that the telephone receives.

According to one embodiment of the invention, an update package is generated in an update package generator 104, operating, for example, in a personal computer (PC) or in any other type of computer. The update package is stored in an update server 105 and transmitted, via a transmitter 106 to the cellular telephones 102. Hence it is clear that the update server, or the update generator includes or has access to a non-volatile memory on which the update package can be stored.

In the same way, the invention is not limited to cellular networks and/or to cellular telephones 102. It should be appreciated that cellular telephones belong to a group referred to as embedded devices. There are other embedded devices, such as Personal Digital Assistants (PDAs), set-top boxes and other consumer electronic devices that are associated with storages for storing content, and sometimes it is required to update the content stored therein. Yet, it is possible to update also content stored in storages associated with non-embedded devices, such as PCs or other computers.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updatable devices" or "devices" will be used hereinafter, and it should be noted that the term "updatable device" or "device" as used herein can refer to any device that is associated with a storage 107 and allows updating content stored therein.

It was previously explained that in order to update content stored in storages 107, update packages are generated, stored in the update server 105 and conveyed to the updatable devices (such as the cellular telephones 102) and the storages 107 associated therewith. Alternatively, it is possible to convey an update package without storing it first in an update server 105. For example, it is possible to convey the update package directly from the update package generator where it is generated. In such a case the machine where the update generator operates, or the update generator itself is considered as the update server 105.

Furthermore, in the example illustrated in FIG. 1 the update package is conveyed via the transmitter 106. This is also non-limiting and any other way applicable for conveying the update package can be used. For example, it is possible to store the update package on a portable storage 107 such as a compact disk or disk-on-key thus allowing an updatable device (such as the cellular telephones 102) to access the update package by reading it therefrom.

Herein below, for simplicity of description storage 107 and/or the updatable device (such as cellular telephone 102) will be written without reference numerals. It is also noted that the single form of update package used herein refers both to embodiments where a single update package provides instructions for an update process and where a plurality of update packages together provide instructions for an update process.

In certain embodiments the storage associated with an updatable device includes both volatile memory and non-volatile memory. For example, it is assumed that the storage includes a non-volatile memory which stores updatable content (i.e., content which may be updated in place), and original content in this non-volatile memory may be updated in-place by new content during an in-place update process. The non-volatile memory which is used for storing the updatable content is termed herein below "updatable content memory". Not all of the content in the updatable content memory is necessarily changed during any particular in-place update and therefore in some cases, some of the content after the completion of an in-place update may be identical to some of the content prior to the in-place update. Typically although not necessarily the updatable content memory is organized in blocks.

In some cases during the in-place update process, not only is the updatable content memory written to, but also volatile memory and/or other non-volatile memory included in the storage are written to. Typically, although not necessarily, the volatile memory to which is written during the in-place update process (and during the pre-update process) is not organized in blocks, for example RAM. The (optional) non-volatile memory which may in some cases be written to during the in-place update process (but which is not updatable content memory) is termed herein below "backup buffer" or "backup memory". In certain embodiments with a backup buffer, the backup buffer may be written to at other times in addition to or instead of during the in-place update process. In some cases, data stored within the backup buffer enables the in-place update process to be reliable. An in-place update process is termed herein "reliable", provided that the in-place update process can be resumed even subsequent to an interruption which caused volatile memory to be erased and possibly a block in storage to be corrupted. It should be appreciated that the content of this block is sometimes corrupted during the interruption and sometimes not. Yet, because it is sometimes impossible to determine or to be certain whether the content thereof is corrupted or not, the content stored in this block is considered as undependable content.

Because the in-place update process writes new content in place of old content, the updatable content memory includes a combination of the old content and the new content during the in-place update process. In the described embodiments, during the in-place update process, the updatable device is operational (i.e., all operations which use content in the updatable content memory are allowable).

Figure 2:
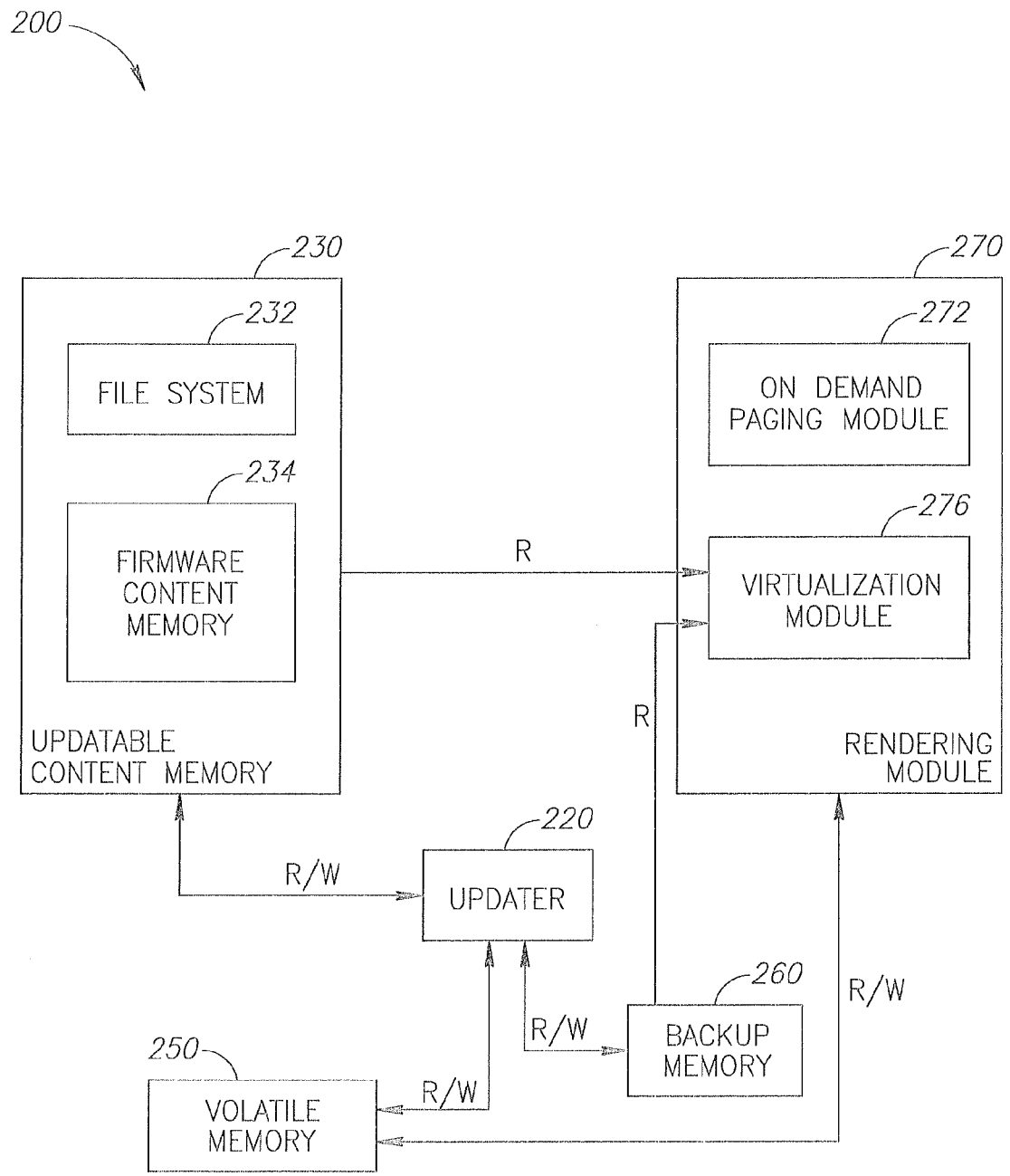
FIG. 2 is a high level schematic illustration of an apparatus for in-place updating content, in accordance with an embodiment of the invention.

Referring now to FIG. 2, FIG. 2 is a high level schematic illustration of an apparatus 200 for in-place updating content, according to an embodiment of the present invention. For example, an updatable device and associated storage thereof may comprise apparatus 200.

In the illustrated embodiment, apparatus 200 includes an updater 220, an updatable content memory 230, a volatile memory 250 (e.g., RAM) written to during the in-place update process, a non-volatile backup buffer 260, and a rendering module 270. In other embodiments, there may be more, less and/or different modules included in apparatus 200. For example, in one embodiment backup buffer (i.e., backup memory) 260 may be omitted, whereas in another embodiment backup memory 260 may be subdivided into separate units for separate storage functions. In other embodiments the functionality described with reference to a particular module may be performed additionally or alternatively by one or more of the other modules.

In one embodiment, updatable content memory 230 includes file system 232, and/or firmware content memory 234. File system 232, for example, is read/write memory. Firmware content memory 234, for example, is a read only memory which stores software. In one embodiment, backup memory 260 includes volatile memory (e.g., RAM), non-volatile memory (e.g., flash), and/or a non-volatile memory extension (for example which may be external). Backup memory 260 may be used in some cases to protect data for the in-place update process. For example backup memory 260 may protect the update package (e.g., which includes a delta or is of any other type), data which would not be available in updatable content memory 230 when needed during the in-place update process (for example because of write before read conflicts), data which allows the in-place update to be reversible (i.e., rolled back), and/or data which will allow a continuation of the update process if there is an interruption which erases volatile memory. In another embodiment, in addition to or instead of being stored in backup memory 260, the update package may be stored in file system 232, volatile memory 250 and/or in any appropriate volatile or non-volatile memory. Hereinbelow, "update package memory" refers to the memory where the update package is stored, regardless of the type of memory.

Each of updater 220 and rendering module 270 may be made up of any combination of software, firmware and/or hardware capable of performing the functions described and defined herein, principally the in-place update process and rendering process respectively while the device is operational.

In the illustrated embodiment, rendering module 270 includes an on-demand paging module 272 and a virtualization module 276. Each of on-demand paging module 272 and virtualization module 276 may be made up of any combination of software, firmware and/or hardware capable of performing the functions described and defined herein. In one embodiment, virtualization module 276 may share sub-modules which perform certain common functions with updater 220.

In one embodiment, rendering module 270 is included in the operating system, but this is not necessarily the case. For example, in other embodiments, rendering module 270 may be included in another application, may be stand-alone, etc. In other embodiments, rendering module 270 may include less, more and/or different modules than illustrated in FIG. 2. In other embodiments the functionality described with reference to a particular module of rendering module 270 may be performed additionally or alternatively by one or more other modules. For example, some functionality ascribed to virtualization module 276 in the description below may be performed by on-demand paging module 272 in another embodiment, or vice versa.

In the illustrated embodiment, when an attempt is made to access a page by an application unrelated to the update process, or by a user, on-demand paging module 272 provides the page to the application or to the user. For example, in various embodiments, on-demand paging module 272 may provide the page by loading the page into volatile memory 250, by providing the address of the page, or by any other manner as is known in the art. For simplicity of description, it is assumed that each page whose access is attempted is a block of content in updatable content memory 230. The block whose use is attempted is termed herein below "requested block". The application (unrelated to the update process) or user which is attempting to access the requested block is termed herein below "requester". In the illustrated embodiment, during the in-place update process performed by updater 220, virtualization module 276 supplies the requested block to on-demand paging module 272. Depending on the embodiment, virtualization module 276 may supply an updated version of the block or the original version of the requested block to on-demand paging module 272. For simplicity of description, it is assumed in the embodiment illustrated in FIG. 3 that virtualization module 276 supplies an updated version of the requested block but in an embodiment where virtualization module 276 supplies an original version, a similar method to that described below with reference to FIG. 3 may be used, mutatis mutandis. On-demand paging module 272 then provides the block supplied by virtualization module 276 to the requestor.

It is noted that updatable device and associated storage thereof are not necessarily limited to including apparatus 200 and may include other elements which are known in the art but are not illustrated and described herein since these other elements and do not add to the understanding of the invention.

Figure 3:
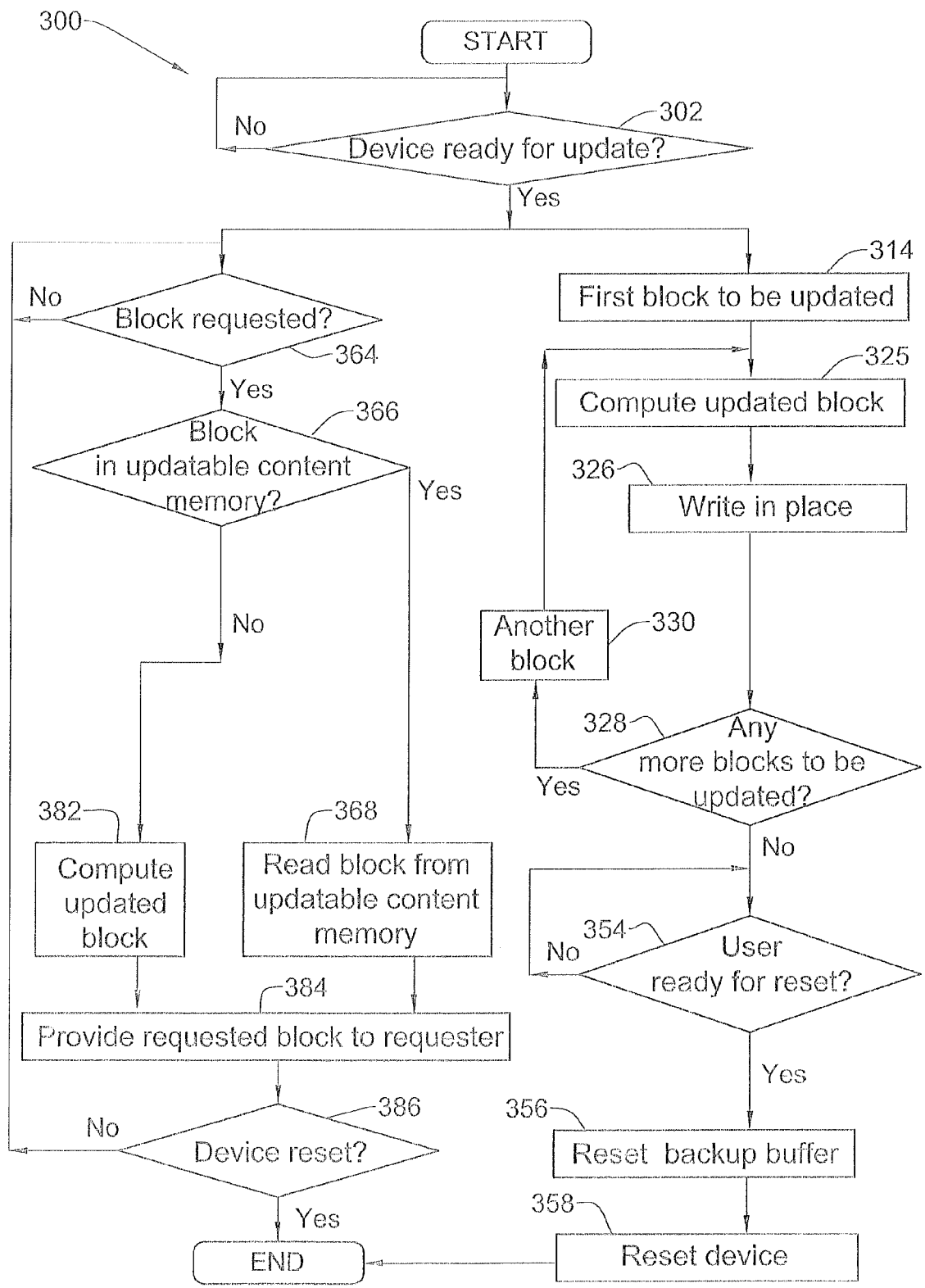
FIG. 3 is a high level flowchart of a method for in-place updating content, in accordance with an embodiment of the invention.

FIG. 3 illustrates a method 300 for in-place updating content, according to an embodiment of the present invention. Method 300 is performed while the updatable device is operational (i.e., when e.g., all operations which use content in the updatable content memory are allowable). In other embodiments, there may be more, less and/or different stages than illustrated in FIG. 3, the stages may be performed in a different order, and/or stages shown as sequential (or in parallel) may be performed in parallel (or sequentially). In one embodiment, method 300 or a part thereof is executed by apparatus 200.

In the illustrated embodiment, in stage 302, it is decided whether or not the updatable device is ready to be updated, and if the updatable device is not ready, then execution of the remainder of method 300 is deferred.

For example, in one embodiment, the device may check in stage 302 that an update package which provides instructions for the current update process has been obtained (for example received/loaded) and stored in an update package memory which is accessible to updater 220. The update package memory may be non-volatile or volatile but it should be evident that storing the update package in a non-volatile memory is more reliable than in a volatile memory, because the update package will then still be accessible in case there is an interruption which causes volatile memory to be erased. For simplicity's sake it is assumed that the update package is stored in a non-volatile update package memory in backup memory 260. It is appreciated that the updatable device may have received the update package previously from the update server 105 and stored the package in the update package memory. Alternatively, the update package may have been loaded for example to the update package memory by any applicable means, such as by copying it from a portable (removable) memory device (e.g., a memory card or compact disc) or from a connected external memory device or by receiving it from the Internet.

As another example, updatable device may alternatively or additionally check in stage 302, that updatable device includes enough memory to run the update process in accordance with the update package. According to one embodiment of this example, if the update package includes an indication of the size of any required non-volatile backup memory, this required backup memory size is compared with the buffer size available in backup memory 260 of the updatable device, deferring execution of the remainder of method 300 if the size of available backup buffer 260 is not enough.

Assuming that the updatable device is ready to be updated, method 300 continues to stage 314.

In stage 314, updater 220 begins updating the first block to be updated. Depending on the embodiment, the first block to be updated may be dynamically selected, or may be the first in an update sequence specified in the update package. The update sequence specified in the update package may have been decided randomly, may have been based on the order of the block in updatable content memory 230, may have been selected in order to limit the potential number of write before read conflicts, or for any other reason. For example, U.S. Pat. No. 6,018,747 to Burns et al., and U.S. Publication No. 20050216530 to Meller et al. describe determination of update sequences in update packages. Similarly, in embodiments with dynamic selection, the dynamic selection may be random, may be based on the order of the block in updatable content memory, may be made in order to limit the potential number of write before read conflicts, or may be made for any other reason.

Stages 325 and 326 are then performed with updater 220 generating in volatile memory 250 the updated block and writing the updated block in place to updatable content memory 230. The invention does not limit the procedure(s) for performing stages 325 and 326. Depending on the embodiment, any suitable procedure(s) may be performed. For example, U.S. Pat. No. 6,018,747, U.S. Publication No. 2005/0216530, U.S. Publication No. 2006/0004756, and U.S. Publication No. 2010/0185921, describe examples of various procedure(s). In one embodiment of stage 325, for example in some cases where the update package includes a delta, updater 220 first reads the original block from updatable content memory 230 prior to generating the updated block. In one embodiment of stage 325, the updated block may be generated for example based on any of the original block and/or data in backup buffer 260.

In some embodiments, prior to overwriting an original block, data may be stored into non-volatile back-up memory 260. Examples of what may be stored in backup memory 260 prior to the overwriting an original block include inter alia: the original or updated block (at least until the updated block has been safely written to updatable content memory 230), any part of the original block which is needed for later updating of other block(s) (thereby preventing write before read conflicts), data which allows an updated block to be rolled back to original content, and/or data which will allow a continuation of the in-place update process if there is an interruption which erases volatile memory. The storage in backup memory 260 may occur immediately prior to the overwriting of stage 326 of the original block (or of the first of a plurality of related original blocks) and/or may occur earlier in method 300, for example prior to stage 314. However in other embodiments, there may not be a non-volatile backup memory. It should be noted that although storage in non-volatile backup memory 260 may increase reliability in case of interruption, may allow reversibility of the in-place update process, and/or may prevent write before read conflicts, in other embodiments, other techniques may be used additionally or alternatively. For example, other techniques may include inter alia: storing data in the update package which itself is stored in a (non-volatile) update package memory. Examples of data which may be stored in the update package include inter alia: add commands which were converted from copy commands, and data which will allow a continuation of the in-place update process if there is an interruption which erases volatile memory. It should be understood that storage in non-volatile backup memory and/or usage of the other described techniques in not required by all embodiments of the invention.

In stage 328 a decision is made whether or not there are more blocks to be updated. If there is at least one other block to be updated (yes to stage 328), then another block is selected to be updated in stage 330. Each time, the next block may be dynamically selected or may be the next block in an update sequence specified in the update package. Stages 325 to 326 are iterated for each of the blocks to be updated.

In other embodiments, the in-place update may be rolled back at any iteration of stage 328 instead of proceeding to update the next block to be updated, for example upon request of the user. In these embodiments, instead of proceeding to update the next block, updater 220 rolls back the updated content starting with the last updated block, undoing each of the commands in the update package in the reverse order and overwriting the updated block with the original content.

Updater 220 then proceeds to roll back the updated content for the second to last updated block (in stage 330), continuing until all the updated blocks have been replaced with original content. For example the rollback can proceed as described in the aforementioned U.S. Publication No. 2006/0004756. During the rollback, updater 220 may in some cases use stored data in backup memory 260 which is required for the rollback. For example, assuming that data which is required for the rollback was previously stored to backup memory 260 earlier in method 300 (for example prior to overwriting the corresponding original block), then in stage 325 updater 220 may determine the original (rolled back) version of that block based on the stored data in backup buffer 260 and possibly also based on the updated version of the block. In stage 326 of this embodiment, the updated block in updatable content memory 230 is overwritten by the original (rolled back) version of the block. In this embodiment, the rollback iterates for all updated blocks, until there are no more updated blocks to rollback to original content (i.e., until the answer is "no" in stage 328).

Once all the blocks that are supposed to be updated have been updated or conversely once the rollback has been completed and all the updated blocks have been rolled back into original content (no to stage 328), then in stage 354, the updatable device determines if the user is ready for a reset of the device. If the user is ready, then the device is reset in stage 358 for the updated version of content, or for the original version of content if the in-place update process was rolled back. It is noted that when the device is reset in stage 358, the rendering process also terminates (yes to stage 386) as will be described below. If the user is not ready (no to stage 354), resetting is deferred. For example in one embodiment, the user may be told via the user interface of the updatable device that the device has been updated or rolled back to original content but that the device has to be reset, and permission is sought to reset the device. If the user indicates that the user is not ready for a reset, then in this embodiment, the updatable device remains operational, resetting is deferred, and the updatable device may repeat the question at a later time. It is assumed that either the first time the user is asked or during a subsequent time that the user is asked, the user will agree to reset the device, especially considering the relatively short period during which the device is being reset and is non-operational.

In the illustrated embodiment, it is assumed that stage 354 is executed, because the user might not like the updatable device to stop being operational at an inconvenient time. However in other embodiments, the updatable device may omit stage 354 and reset the device after a "no" to stage 328, with or without first notifying the user. For example in one of these other embodiments, the updatable device may determine when the device should be reset without first consulting the user, and the reset can occur with or without prior notice to the user. Continuing with the example, in some case, the updatable device may be reset for example during the next recharging of a non-empty battery of the updatable device.

Optionally in stage 356, prior to resetting the device in stage 358 part or all of backup buffer 260 may be freed, for example by the memory management designating the space as available. In other embodiments, stage 356 may be partially or fully omitted.

In parallel to the in-place update process, a rendering process is performed by rendering module 270, beginning with stage 364. Although for conciseness, each function in the rendering process is ascribed to a particular module in rendering module 270, in other embodiments a specific function ascribed to a particular module may be additionally or alternatively performed by a different module of rendering module 270. For example, some functions ascribed to virtualization module 276 in the description below may be performed by on-demand paging module 272 in other embodiments, or vice versa.

Before continuing with the description of the rendering process, the reasoning for a rendering process which works in parallel to the in-place update process for the illustrated embodiment of FIG. 3 is elaborated upon.

It is noted that before the device is ready for update (i.e., before stage 314), there is no need for a rendering process which inter alia checks whether a requested block includes updated or original content in updatable content memory 230, because all blocks in updatable content memory 230 are original blocks until the in-place update process begins. Therefore, before the in-place update process begins, on-demand paging module 272 may work conventionally, reading any requested block from updatable content memory 230 (without requiring the assistance of virtualization module 276) and providing the requested blocks to the requester. Alternatively, virtualization module 276 may read any original requested block from updatable content memory 230, supply the requested block to on-demand paging module 272, and on-demand paging module 272 in turn may provide the supplied block to the requester.

During the in-place update process, there is a combination of old content and new content in updatable content memory 230. Because the device is operational during the in-place update process, an operation unrelated to the update can use content from updatable content memory 230 (i.e., content can be requested by a requester). It should be evident that it would be preferable that content provided by on-demand paging module 272 to the requester be consistent (i.e., all provided content either be updated content or original content, where in some cases the two may be identical), and therefore not necessarily in the format currently stored in updatable content memory 230 (which could result in some provided content being original content and some being updated content).

In order to supply consistent content to on-demand paging module 272 (which in turn provides that content to the requester), virtualization module 276 may need to update the content of requested blocks which have not yet been updated in updatable content memory 230 but are supposed to be updated in-place, or may need to reverse (i.e., roll back) the content of requested blocks which have already been updated in updatable content memory 230 back to the original content.

Therefore in stage 364 on-demand paging module 272 determines whether or not a block has been requested. If no block has been requested (no to stage 364), on-demand paging module 272 waits until a block will be requested. If a block has been requested (yes to stage 364) then in stage 366, virtualization module 276 determines whether the requested block in updatable content memory 230 includes original content or updated content. As mentioned above, in some cases, the content of a block in the updated version may be identical to the original content of that block in the original version.

In some embodiments where updater 220 follows an update sequence specified in an update package, virtualization module 276 has access to the update package (for example which may be stored in backup memory 260), and virtualization module 276 is aware of the last block updated or rolled back in updatable content memory 230 and whether or not the in-place update process has been rolled back. In one of these embodiments in stage 366, virtualization module 276 can check a direction indicator as disclosed in U.S. Publication No. 2006/0004756 to determine whether or not the in-place update process has been rolled back. In one of these embodiments the memory management can identify the last block that was updated or rolled back and virtualization module 276 can consult the memory management in stage 366 in order to determine the last block updated or rolled back. In one of these embodiments, in stage 366 virtualization module 276 can check the update sequence in the update package to find out whether or not the requested block is in the update sequence and therefore scheduled or not scheduled to be updated in the update process, and if scheduled to be updated whether the requested block is earlier or later in the update sequence than the last updated or rolled back block in updatable content memory 230. In this embodiment, virtualization module 276 thereby knows if the requested block has original content which does not need to be updated and will remain the same in the updated version (because the block is not in the update sequence), or if the requested block which is in the update sequence has original or updated content in updatable content memory 230. For example, in some cases, any block later in the update sequence than the last updated or reversed block has original content and any block earlier in the updated sequence has updated content. In one embodiment where updater 220 selects blocks based on an update sequence specified in the update package or in another embodiment where updater 220 selects blocks dynamically, updated and/or original blocks in updatable content memory 230 may be signed by updater 220. Thus, in these embodiments virtualization module 276 can distinguish between updated content blocks and original content blocks in updatable content memory 230 or between differently signed updated content blocks and original content blocks in updatable content memory 230. In one embodiment where updater 220 selects blocks based on an update sequence specified in the update package or in another embodiment where updater 220 selects blocks dynamically, updater 220 may keep a list of updated blocks with the list being accessible to virtualization module 276. Therefore, in these embodiments, virtualization module 276 can consult the list, aware that a requested block if on the list has been updated and if not on the list, has not been updated or has had content reversed back to original content. In one embodiment where updater 220 selects blocks based on an update sequence specified in the update package or in another embodiment where updater 220 selects blocks dynamically, virtualization module 276 can determine that a block which includes original content is not scheduled to be updated in the update process (and therefore will remain the same in the updated version) by verifying that the update package does not include any update commands regarding that block.

If content corresponding to an updated version is to be provided to the requester and the requested block in updatable content memory 230 has content which has been updated or the requested block has content which is identical in the original and updated versions (yes to stage 366), then in stage 368 virtualization module 276 reads the requested block from updatable content memory 230. In stage 384 virtualization module 276 supplies the requested block to on-demand paging module 272, and on-demand paging module 272 in turn provides the supplied block to the requester. Similarly, in an embodiment where original content is to be provided to the requester, and the requested block has original content in updatable content memory 230 (yes to 366) then virtualization module 276 reads the original requested block from updatable content memory 230 in stage 368. In stage 384, virtualization module 276 then supplies the original block to on-demand paging module 272, and on-demand paging module 272 in turn provides the supplied block to the requester. In one embodiment, stages 366, 368, and 384 may instead be performed by on-demand paging module 272.

Alternatively if the answer to stage 366 is no, then stage 382 is performed with virtualization module 276 generating the updated or rolled back block in volatile memory 250. In one embodiment of stage 382, for example in some cases where the update package includes a delta, the original block or updated block is first read from updatable content memory 230 prior to generating the updated or rolled back block respectively.

An updated or reversed block may be generated in stage 382 using any suitable updating procedure, for example based on any of the original/updated block and/or data in backup buffer 260. For example, the updated or reversed block may be generated as described in the aforementioned U.S. Pat. No. 6,018,747 and U.S. Publication No. 2005/0216530, U.S. Publication No. 2006/0004756, and/or U.S. Publication No. 2010/0185921. It is noted that some of the procedures noted in these publications are also valid for stage 382 even though blocks are not usually requested and updated/reversed by virtualization module 276 in a pre-specified update sequence, while in these publications in contrast a pre-specified update sequence is typically although not necessarily followed. For example, similarly to what is described in these publications, as long as content which is required for updating or rolling back the requested block by virtualization module 276 is available (for example in updatable content memory 230 and/or elsewhere), the updating or rolling back of any requested block may be performed by virtualization module 276. Continuing with the example, in one embodiment it is assumed for the sake of ease of understanding that updater 220 follows an update sequence, and that updater 220 protects in backup buffer 260 at least data which is required for rolling back content and/or original data from updated blocks which is needed for the updating of other block(s) later in the update sequence. In this embodiment, it is also assumed that the requester may request blocks from on-demand paging module 272 in an arbitrary order, not necessarily in line with the order in which the blocks are being updated/rolled back. In this embodiment, if updated content is desired, updating by virtualization module 276 occurs if the requested block is later in the update sequence than the block currently being updated or rolled back. In this case the virtualization module 276 may update the original content of the requested block if desired, based on the original content in the requested block, the original content in blocks later in the update sequence than the requested block, and/or based on original content which was protected in backup buffer 260 from blocks earlier in the update sequence than the requested block. Similarly in this embodiment, if rolled back original content is desired, rolling back by virtualization module 276 occurs if the requested block is earlier in the update sequence than the block currently being updated or rolled back. In this case, virtualization module 276 may roll back the updated content of the requested block, based on the updated content of the requested block and/or based on data which was protected in backup buffer 260 which allows the requested block to be rolled back to original content.

In stage 384 virtualization module 276 supplies the updated block to on-demand paging module 272, and on-demand paging module 272 in turn provides the supplied block to the requester. In another embodiment, stages 366, 382, and 384 may be performed by on-demand paging module 272.

In stage 386, it is determined whether or not the device has been reset (i.e., whether or not stage 358 has been performed). If the device has been reset, then the rendering process ends.

If the device has not been reset then the rendering process iterates back to stage 364, waiting for a request for another block. In one embodiment, a determination of whether the device has been reset may be made any time during the execution of stages 364 to 386, ending the rendering process once the device has been reset or proceeding to the next stage if the device has not been reset.

Once the device has been reset, there is no longer a need for a rendering process which inter alia checks whether or not a requested block comprises original or updated content in updatable content memory 230, because all blocks whose content differs between the original version and the updated version would have been updated (or rolled back) prior to reset. Therefore, after the device has been reset, on-demand paging module 272 may work conventionally, retrieving any requested block from updatable content memory 230 (without requiring the assistance of virtualization module 276) and providing the requested blocks to the requester. Alternatively, virtualization module 276 may read any requested block from updatable content memory 230, supply the requested block to on-demand paging module 272, and on-demand paging module 272 in turn may provide the supplied block to the requester.

It will also be understood that the invention discloses a computer program being readable by a computer for executing any of the methods of the invention. The invention further discloses a machine-readable memory tangibly embodying a program of instructions executable by the machine for executing any of the methods of the invention. In the same way, the invention is not limited to cellular networks and/or to cellular telephones 102. It should be appreciated that cellular telephones belong to a group referred to as embedded devices. There are other types of embedded devices, for example: Personal Digital Assistants (PDAs), set-top boxes and other consumer electronic devices which are controlled and operated by a CPU and software and therefore are associated with storages for storing content, and sometimes it is required to update the content stored therein. Such consumer electronic device can be Cameras, e-book readers, Mobile Internet Devices (MID), Navigation systems, car infotainment systems, and more. Embedded device can be also general utility home appliances which are electronically controlled by a CPU and Software, such as washing machines, DVD players, Blue-ray players and other home entertainment systems. Furthermore, embedded devices can be medical devices which are controlled by CPU and software, whether outside the human body or inside the human body, such as pacemakers. Embedded devices can also be part of avionic and aerospace control systems involved in guidance and other functions of the craft in which they are embedded in. All these examples of embedded device represent devices associated with storage holding content which sometimes may require updating. There are many more examples of embedded devices and the above provided examples just demonstrate the possible variety and should not be construed as a concise list. Yet, it is possible to update also content stored in storages associated with non-embedded devices, such as PCs or other general purpose computers. For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

In the same way, the invention is not limited to cellular networks and/or to cellular telephones 102. It should be appreciated that cellular telephones belong to a group referred to as embedded devices. There are other types of embedded devices, for example: Personal Digital Assistants (PDAs), set-top boxes and other consumer electronic devices which are controlled and operated by a CPU and software and therefore are associated with storages for storing content, and sometimes it is required to update the content stored therein. Such consumer electronic device can be Cameras, e-book readers, Mobile Internet Devices (MID), Navigation systems, car infotainment systems, and more. Embedded device can be also general utility home appliances which are electronically controlled by a CPU and Software, such as washing machines, DVD players, Blue-ray players and other home entertainment systems. Furthermore, embedded devices can medical devices which are controlled by CPU and software, whether outside the human body or inside the human body, such as pacemakers. Embedded devices can also be part of avionic and aerospace control systems involved in guidance and other functions of the craft in which they are embedded in. All these examples of embedded device represent devices associated with storage holding content which sometimes may require updating. There are many more examples of embedded devices and the above provided examples just demonstrate the possible variety and should not be construed as a concise list. Yet, it is possible to update also content stored in storages associated with non-embedded devices, such as PCs or other general purpose computers.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updatable devices" or "devices" will be used hereinafter, and it should be noted that the term "updatable device" or "device" as used herein can refer to any device that is associated with a storage 107 and allows updating content stored therein.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of in-place updating an original version of content to an updated version of content, in a non-volatile memory storage device, the method comprising:
   providing a non-volatile content memory storage area;
   performing, while at least part of the non-volatile content memory storage area is being used for purposes other than updating, at least one in-place update operation, wherein the at least one in-place update operation comprises writing at least one block of updated content over a corresponding block of original content in the non-volatile content memory storage area; and
   performing, while the at least one in-place update operation occurs, a rendering process that includes providing requested content of at least one block of a particular version, associated with the non-volatile content memory storage area, to a requester, wherein
   the requested content of the at least one block may or may not be available on the non-volatile content memory storage area, and
   the particular version provided to the requester is one of at least the original version and updated version.

2. The method of claim 1, wherein the providing of requested content from the non-volatile content memory storage area comprises reading content from the non-volatile content memory storage area and providing the read content.

3. The method of claim 1, wherein in case the requested content is not available on the non-volatile content memory storage area, the providing of the requested content further comprises generating the requested content using at least part of the content available on the non-volatile content memory storage area.

4. The method of claim 3, wherein in case the requested content is associated with the updated version and is unavailable on the non-volatile content memory storage area, the generating of the requested content further comprises an update that creates the updated content from at least part of the content available on the non-volatile content memory storage area.

5. The method of claim 3, wherein in case the requested content is associated with the original version and is unavailable on the non-volatile content memory storage area, generating of the requested content further comprises a roll-back update that restores the original content from at least part of the content available on the non-volatile content memory storage area.

6. A system for updating an original version of content to an updated version of content, in a non-volatile memory storage area, the system comprising:
   a non-volatile content memory storage area;
   an in-place update module, and
   a rendering module,
   wherein the in-place update module is arranged to perform, while at least part of the non-volatile content memory storage area is being used for purposes other than updating, at least one in-place update operation, wherein the at least one in-place update operation comprises writing at least one block of content associated with a particular version onto a corresponding block of content associated with a version other than the particular version; and
   wherein the rendering module is arranged to perform, while the at least one in-place update operation occurs, a rendering process that includes providing requested content of at least one block of a particular version associated with the non-volatile content memory storage area, to a requester, wherein said requested content of the at least one block may or may not be available on the non-volatile content memory storage area, and said particular version provided to the requester is one of at least the original version and updated version.

7. The system of claim 6, wherein the non-volatile content memory storage area includes a non-volatile backup buffer operatively associated with the rendering module, wherein the backup buffer holds at least part of the requested content thereby enabling the providing thereof.

8. The system of claim 6, wherein said rendering module comprises:
- a virtualization module configured to perform at least one of (i) generating updated or original requested content and (ii) reading requested content from the non-volatile content memory storage area; and
- an on-demand paging system arranged to receive the requested content from the virtualization module, and to provide said requested content to a requester.

9. The system of claim 6, wherein the providing of requested content from the non-volatile content memory storage area comprises reading content from the non-volatile content memory storage area and providing the read content.

10. The system of claim 6, wherein in case the requested content is not available on the non-volatile content memory storage area, the providing of the requested content further comprises generating the requested content using at least part of the content available on the non-volatile content memory storage area.

11. The system of claim 10, wherein in case the requested content is associated with the updated version and is unavailable on the non-volatile content memory storage area, the generating of the requested content further comprises an update that creates the updated content from at least part of the content available on the non-volatile content memory storage area.

12. The system of claim 10, wherein in case the requested content is associated with the original version and is unavailable on the non-volatile content memory storage area, generating of the requested content further comprises a roll-back update that restores the original content from at least part of the content available on the non-volatile content memory storage area.

13. A computer program product implemented on a non-transitory machine readable storage device, tangibly embodying a program of instructions executable by the machine to perform method steps for updating original content stored in a non-volatile content memory storage area associated with a device to yield updated content, the method comprising:
- performing, while at least part of the non-volatile content memory storage area is being used for purposes other than updating, at least one in-place update operation, wherein the at least one in-place update operation comprises writing at least one block of content associated with a particular version onto a corresponding block of content associated with a version other than the particular version; and
- performing, while the at least one in-place update operation occurs, a rendering process that includes providing requested content of at least one block of a particular version from the non-volatile content memory storage area to a requester, wherein
- the requested content of the at least one block may or may not be available on the non-volatile content memory storage area, and
- the particular version provided to the requester is one of at least the original version and updated version.

* * * * *